United States Patent [19]

Stenzenberger et al.

[11] Patent Number: 4,917,954
[45] Date of Patent: Apr. 17, 1990

[54] LAMINATED ARTICLE FROM CURABLE RESIN COMPOSITION COMPRISING BIS MALEIMIDE AND ALKENYL PHENYL HYDROXY ETHER

[75] Inventors: Horst Stenzenberger; Peter Koenig, both of Schriesheim, Fed. Rep. of Germany

[73] Assignee: Technochemie GmbH, Fed. Rep. of Germany

[21] Appl. No.: 278,035

[22] Filed: Nov. 30, 1988

Related U.S. Application Data

[62] Division of Ser. No. 942,696, Dec. 17, 1986, Pat. No. 789,704.

[30] Foreign Application Priority Data

Jan. 18, 1986 [GB] United Kingdom ............... 8601201
Sep. 12, 1986 [GB] United Kingdom ............... 8622083

[51] Int. Cl.$^4$ ............................................. B05D 1/36
[52] U.S. Cl. ................................. 428/411.1; 428/421; 428/473.5; 428/500
[58] Field of Search ................ 428/411.1, 421, 473.5, 428/500

[56] References Cited

U.S. PATENT DOCUMENTS 4,789,704 12/1988 Stenzenberger et al. ............ 524/548

Primary Examiner—Harold D. Anderson
Attorney, Agent, or Firm—Jacobs & Jacobs

[57] ABSTRACT

Cured resins of high fracture toughness are prepared from N,N'-bisimides of formula I

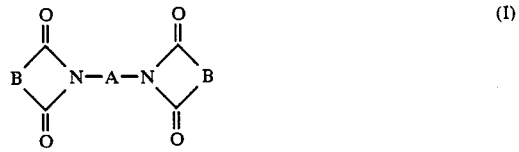

and alkenyl compounds of formula II

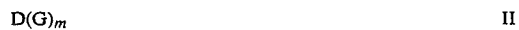

in which D is an m-valent group and G represents a phenyl ring having at least one alkenyl (e.g. allyl or 1-propenyl) substituent.

16 Claims, No Drawings

LAMINATED ARTICLE FROM CURABLE RESIN COMPOSITION COMPRISING BIS MALEIMIDE AND ALKENYL PHENYL HYDROXY ETHER

CROSS-REFERENCE

This is a division of Ser. No. 942,696 filed Dec. 17, 1986, now U.S. Pat. No. 4,789,704.

The present invention relates to curable resins which are used to prepare cured resins of high fracture toughness.

According to a first aspect of the present invention curable resins comprise a mixture of (a) at least one N,N'-bisimide of an unsaturated dicarboxylic acid of formula I

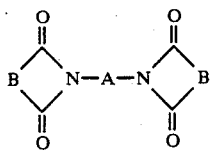

in which B represents a divalent radical containing a carbon-carbon double bond and A is a divalent radical containing at least two carbon atoms and (b) at least one alkenyl compound of formula II $$D(G)_m \quad \text{II}$$

in which m is an integer from 1 to 4, G represents a phenyl ring substituted by at least one alkenyl group and D represents (i) a group of formula IIa $$E\text{-}[OCH_2CH(OH)CH_2O\text{-}]_n \quad \text{IIa}$$

in which E is a n-valent group and n is an integer from 1 to 4, (ii) a divalent group of formula IIb

in which F is a divalent group chosen from —SO₂—, —SO—, —CMe₂—, —O—, —C(CF₃)₂—, —CH₂— or —CO—, (iii) a group of formula IIc

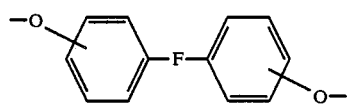

in which F is as defined in (ii) above, (iv) a divalent group of formula IId

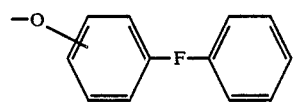

or (v) a divalent group of formula IIe

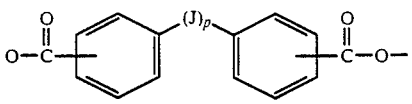

in which J is a divalent group chosen from —SO₂—, —SO—, —CMe₂—, —O—, —C(CF₃)₂—, —CH₂— or —CO— and p is 0 or 1.

The radical designated A in general formula I may be (a) an alkylene group with up to 12 carbon atoms, (b) a cycloalkylene group with 5 to 6 carbon atoms, (c) a heterocyclic group with 4 to 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formula IIIa to IIIj $$-N=N- \quad \text{IIIa}$$

IIIb $$-NR^1- \quad \text{IIIc}$$

$$-P(O)R^2- \quad \text{IIId}$$

IIIe $$-SO_2- \quad \text{IIIf}$$

IIIg

IIIh

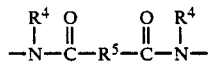
IIIi

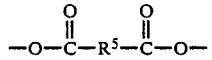
IIIj the radicals R₁, R₂, R₃, R₄, being alkyl groups with one to five carbon atoms, R₅ being an alkylene group or an arylene group.

The radical B in the general formula I represents a divalent organic radical containing a carbon-carbon double bond. The radical B may have a structure as shown in formula IV, V, VI or VII

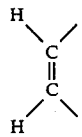
IV

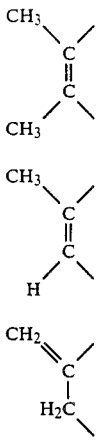

Bismaleimides of formula I in which the radical B is of formula IV may be used for producing the new curable resins of the present invention. Examples of suitable bismaleimides are 1,2-bismaleimidoethane, 1,6-bismaleimidohexane, 1,12-bismaleimidododecane, 1,6-bismaleimido(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 3,3'-bismaleimidodiphenylsulphone, 4,4'-bismaleimidodiphenylsulphone, 4,4'-bismaleimidodicyclohexylmethane, 2,4-bismaleimidotoluene, 2,6-bismaleimidotoluene, 2,4-bismaleimidoanisole, N,N'-m-xylylenebismaleimide, N,N'-p-xylylenebismaleimide. Examples of other suitable bisimides are N,N'-m-phenylene-biscitraconomide and N,N'-4,4'-diphenylmethane-citraconimide, in which the radical B is of formula VI and N,N'-4,4'-diphenylmethane-bis-itaconomide in which the radical B is of formula VII. Mixtures of bisimides may be used. Preferred mixtures of bismaleimides are those which form low melting eutectic mixtures for example (i) eutectic mixtures containing 4,4'-bismaleimidodiphenylmethane and 2,4-bismaleimidotoluene, (ii) eutectic mixtures containing 4,4'-bismaleimidodiphenylmethane, 2,4-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

The bisimides of formula I may be modified with amino acid hydrazides (for example m-aminobenzoic acid hydrazide), polyamines, polyhydrazides, azomethines, polyisocyanates, carboxy-terminated or acrylic/vinylterminated polybutadiene/acrylonitrile elastomers, thermoplastic polymers (for example polysulphones, polyhydantoins and polyimides) or mixtures thereof. These modified bisimides are used in a similar manner to that described herein for bisimides of formula I to prepare curable resins of the present invention.

In the alkenyl compounds of formula II, G may represent a phenyl ring carrying one or more allyl or 1-propenyl substituents. Additional substituents (for example methoxy) may also be present.

In alkenyl compounds of formula II in which D represents a polyvalent group of formula IIa, the group E may be (i) an alkylene group, (ii) a cycloalkylene group containing 5 or 6 carbon atoms, (iii) phenylene, (iv) a heterocyclic group containing at least one nitrogen, oxygen or sulphur atom in the ring, (v) a mono or dicarbocyclic group, (vi) a group of formula IIf $$K\text{-}(L)_q\text{-}K \qquad \text{IIf}$$

in which K represents an optionally substituted mono or dicarbocyclic aromatic or cycloalkylene group, q is 0 or 1 and L is a divalent group selected from —SO$_2$—, —SO—, —CMe$_2$—, —O—, —C(CF$_3$)$_2$—, —CH$_2$— or —CO— or (viii) a high molecular weight epoxy resin (for example an epoxy resin formed by the reaction of epoxy compounds with bisphenol A). Alkenyl compounds of formula II in which D represents a group of formula IIa may be prepared by the reaction of epoxy compounds with alkenylphenols such as o-allylphenol, p-allylphenol, eugenol, isoeugenol, o-(1-propenyl)-phenol or p-(1-propenyl)phenol (anol) at temperatures between 80° and 150° C. in the presence of a catalyst such as triphenylphosphine or alkyltriphenylphosphonium halides. The reaction may be performed in the presence of an inert organic solvent or in the absence of a diluent. The amount of alkenylphenol present may be such that no residual epoxy groups remain at the end of the reaction or the amount of alkenylphenol may be lower than a stoichiometric amount to give a compound containing unreacted epoxy groups. One group of preferred alkenyl compounds of formula II may be represented by formula IIg $$G[OCH_2CH(OH)CH_2O]E[OCH_2CH(OH)CH_2O]G$$

in which E is a m-phenylene group or a group of formula IIh

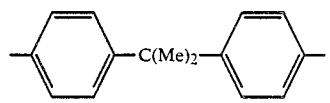

and G represents a group of formula IIj or IIk

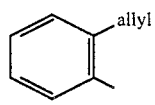

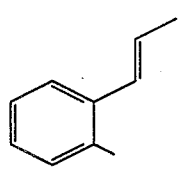

or of formula IIm or IIn

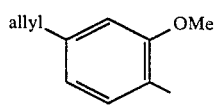

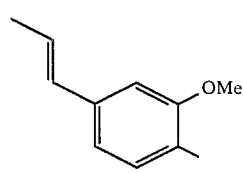

The preferred compounds of formula II in which G represents groups of formulae IIj and IIm may be prepared by the reaction of one mole of 4,4'-bisglycidylbisphenol A with 2 moles of o-allylphenol or eugenol respectively.

Alkenyl compounds of formula II in which D represents a divalent group of formula IIb, may be prepared by the reaction of an alkenylphenol with a compound of formula VIII

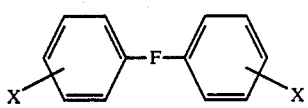

VIII in which X represents halo. Preferred alkenyl compounds in which F is —SO$_2$— may be prepared by heating alkenylphenols with a dichlorodiphenylsulphone at a temperature of around 170°–190° C. in the presence of a solvent (for example N-methylpyrrolidone) and a catalyst (for example potassium carbonate). Preferred alkenyl compounds in which F is —CO— may be prepared by heating alkenylphenols (for example allylphenol, eugenol or diallybisphenol A) with a difluorobenzophenone at a temperature of around 140°–160° C. in the presence of a solvent (for example N-methylpyrrolidone) and a catalyst (for example potassium carbonate). A further group of preferred compounds of formula II may be represented by formula IIp

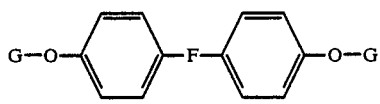

IIp in which F is —SO$_2$— or —CO— and G is a group of formula IIk or IIn. These preferred compounds are prepared by the reaction of allylphenol or eugenol with 4,4'-dichlorodiphenylsulphone or 4,4'-difluorobenzophenone or 2,4'-difluorobenzophenone under the conditions outlined above to give products in which the allyl groups have isomerised to form 1-propenyl groups.

Alkenyl compounds of formula II in which D represents a group of formula IIc may be prepared by the reaction of an alkenylphenol with a compound of formula IX

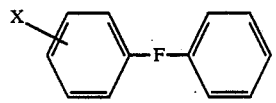

IX in which X represents halo. Preferred compounds in which F is —CO— may be prepared by heating an alkenylphenol with a fluorobenzophenone in the presence of a catalyst (such as potassium carbonate). To prepare these preferred compounds in which G is a group of formula IIk and IIn, allylphenol or eugenol are heated to a temperature of 150°–165° C. with 4-fluorobenzophenone to give a product in which the allyl group has isomerised to a 1-propenyl group.

Alkenyl compounds of formula II in which D represents a group of formula IId or IIe may be prepared by the reaction of the acid chloride of a dicarboxylic acid of formula X or of formula XI

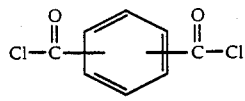

X

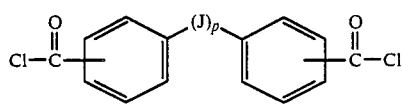

XI with an alkenylphenol [for example o-allylphenol, p-allylphenol, eugenol, isoeugenol, o-(1-propenyl)-phenol or p-(1-propenyl)phenol].

The ratio of the number of moles of bisimide present to the number of moles of alkenyl compound present in the curable resins of the present invention may lie in the range 1:1 to 50:1, preferably in the range 1:1 to 20:1, most preferably in the range 2:1 to 10:1.

The preparation of the new curable resins may be carried out in an inert organic solvent or diluent, for example in dimethylformamide, dimethylacetamide, N-methyl pyrrolidone and tetramethyl urea, or ketone type solvents such as acetone, methylethyl ketone, methyl isobutyl ketone and cyclohexanone or chlorinated solvents such as methylene chloride, ethyl chloride, 1,2-dichloroethane and ether-type solvents such as dioxane, tetrahydrofuran, ethyl glycol and ester type solvents such as ethyl acetate or mixed glycol etheresters such as ethyl glycol acetate, methyl glycol acetate, diethylene glycol diethyl ether, diethylene glycol monoethyl ether acetate etc. in such a manner that prepolymer solutions are obtained. The prepolymer can be isolated by stripping off the solvent either in vacuum or by heat or both, thus providing a solventless resin that can either be processed from the melt or as a powder. The production of the new curable resins according to this invention can also be carried out in inert diluents in which either only one of the starting materials is completely soluble or all the starting components are completely soluble. The latter procedure is preferred when the application of the resin requires a solution as is the case for the production of prepregs.

The preparation of the new curable resins may alternatively be performed by using conventional techniques for mixing and grinding of powders or powders and liquids to intimately blend the bismaleimides with the other components. In this case prepolymers are obtained by heating the homogeneous mixture at a temperature between 80° and 200° C., for sufficient time to produce a still formable and soluble product.

For many industrial applications of the new curable resins of the present invention, it is advantageous to accelerate the curing process by adding catalysts. The catalysts may be present in an amount of 0.01 to 10% by weight (preferably 0.5 to 5% by weight) based on the total weight of the curable bisimide resin. Suitable catalysts include ionic and free radical polymerisation catalysts. Examples of ionic catalysts are (a) alkali metal compounds for example alkali metal alcoholates such as sodium methylate or alkali metal hydroxides, (b) monoamines such as benzylamine, diethylamine, trimethylamine, triethylamine, tributylamine, triamylamine, N,N-dimethylaniline, N,N-dimethylbenzylamine, tetramethyldiaminodiphenylmethane, N,N-diisobutylaminoacetonitrile and N,N-dibutylaminoacetonitrile, (c) heterocyclic amines such as quinoline, N-methylpyrrolidine, imidazole, benzimidazole, N-methylmorpholine and azabicyclooctane, (d) polyamines containing several amino groups of different types such as mixed secondary/tertiary polyamines, (e) quaternary ammonium compounds such as benzyltrimethylammonium hydroxide and benzyltrimethylammonium methoxide and (f) mercaptobenzothiazole. Examples of free radical polymerisation catalysts include (a) organic peroxides such as ditertiary butyl peroxide, diamylperoxide and t-butylperbenzoate and (b) azo compounds such as azoisobutyronitrile. Further catalysts which can be used are metal acetylacetonates especially transition metal acetylacetonates such as vanadium acetylacetonates.

The catalysts can be admixed with the components of the curable resins or they may be added during the production of the prepolymers either by a powder blending process or by the solvent blending process described above.

In many cases the new curable resins of the present invention may be processed from the melt. To reduce the melt viscosity and to improve the pot life the resins can be blended with so-called reactive diluents, preferably those that are liquid at room temperature. The reactive diluents that may be employed carry one or more polymerizable double bonds of the general formula XII

XII and may be of the vinyl-, allyl- or acryloyl- type. These reactive diluents can be of the ether, ester, hydrocarbon or heterocyclic type. Typical ethers that may be employed are vinylallylether, diallylether, methallylether and vinylphenylether. Typical esters are vinyl-, allyl-, methylallyl-, 1-chlorallyl-, crotyl-, isopropenyl esters derived from saturated or unsaturated aliphatic or aromatic mono- or polycarboxylic acids such as formic, acetic, propionic, butyric, oxalic, malonic, adipic, sebacic, acrylic, methacrylic, phenylacrylic, crotonic, maleic, fumaric, itaconic, citraconic, tetrahyrophthalic, benzoic, phenylacetic, o-phthalic, isophthalic or terephthalic acid and naphthalic-dicarboxylic acid or mixtures thereof. The most important hydrocarbon type reactive diluents to be used are styrene, methylstyrene, vinylhexane, vinylcyclohexane, divinylbenzene, divinyl cyclohexane, diallybenzene, vinyltoluene and 1-vinyl-4-ethyl-benzene or mixtures thereof. Examples of heterocyclic type reactive diluents are vinylpyridine and vinylpyrrolidine.

In those cases where reactive diluents are used it is possible to first blend the bisimide components with the reactive diluent and then the other components of the curable resins are added. The quantity of reactive diluent that may be employed can be up to 80% by weight of the total final resin mixture.

Very advantageous reactive diluents are styrene and divinylbenzene which are used in quantities up to 30% of the total resin mixture. Care has to be taken with these diluents because they crosslink at very low temperatures, at around 100°-110° C., therefore mixtures containing these diluents have to be prepared at temperatures well below 100° C.

The new curable resins of the present invention can be further modified with unsaturated polyester resins. Useful unsaturated polyesters are well known products which are prepared by polycondensation of polycarboxylic acid derivatives such as esters with polyglycols as described in detail in Kunststoffhandbuch, Band VII, p. 247-282, Carl Hanser Verlag, Munchen 1973. Solutions of these polyesters in the reactive diluents described above can be used instead of the reactive diluent alone to modify the new resins.

The new curable resins of the present invention either modified or not or prepolymers prepared therefrom can be thermally converted to crosslinked polymers by heating them to temperatures of between 80° and 400° C., for a time sufficient to complete cure.

The new curable resins are advantageously used to produce laminated materials. In such a case the curable resins or prepolymers produced from the curable resins are dissolved in suitable solvents to provide a 25–65% by weight solution, which is used to impregnate (a) glass fibres in the form of fabrics or rovings or (b) carbon fibres, boron fibres or organic synthetic fibres in the form of fabrics, filaments or rovings. The fibres are impregnated with this solution and then the solvent is removed by drying. The fibres which are impregnated with the curable resins of the present invention are then moulded into laminate form by the application of pressure and temperature, as is well known in the art to provide a laminated material in which the crosslinked polymer is the binder. Suitable solvents include dimethylformamide, dimethylacetamide, N-methyl pyrrolidone, tetramethyl urea, acetone, methyl-ethyl ketone, methyl-isobutyl ketone, cyclohexanone, methylene chloride, ethyl chloride, 1,2-dichloroethane, dioxane, tetrahydrofuran, ethyl glycol, ethyl acetate, ethyl glycol acetate, methyl glycol acetate, diethyleneglycol diethyl ether, diethyleneglycol monoethyl ether acetate and mixtures thereof.

The curable resins according to the invention can also be processed by the known methods of the powder moulding industry in relation to curable compositions, to produce mouldings, curing taking place with simultaneous shaping under pressure. For these applications the curable resins are admixed with additives such as fillers, colourants, softeners and flameproofing agents. Ideal fillers are for example glass fibres, carbon fibres, organic high modulus fibres such as aramids, quartz flour, kaolin, silica, ceramics and metals in the form of fine powders for example produced by micronisation.

One of the preferred uses of the new resin composition is as binders for fibre composites. For this application fibres such as glass, graphite or aramids in the form of rovings, fabrics or short fibremats, or felts are impregnated with the composition, employing resin solution as mentioned above to impregnate said reinforcements. After stripping off or drying off the solvent employed a prepreg is left, which in the second phase may be cured at a temperature between 180° and 350° C., optionally under pressure.

In another preferred use of the resin compositions of the present invention the resin is cast into film and sheets of film are stacked alternately with layers of reinforcing material for example glass fibre. The resulting stack is subjected to heat and pressure to form a laminated structure.

The curable resins produced by the present invention are used to produce cured resins which have high fracture toughness. This invention is illustrated by the following Examples which are given by way of example only. In the Examples the fracture toughness is measured by a method derived from that described in ASTM E399-78 in which a bar of resin 51.25 mm long, 6.25 mm wide and 12.5 mm deep is cut from a casting and a groove 5.4 to 6.0 mm deep is cut centrally across the width of the bar. The base of the groove is scored once along its length prior to performing the test.

EXAMPLE 1

Synthesis of o-allylphenol/4,4'-bisglycidylbisphenol-A adduct o-Allylphenol (576.9 g), 4,4'-bisglycidylbisphenol A-epoxy resin (740 g) (Rutapox 0164) and triphenylethylphosphonium iodide (8 g) are placed into a 3 necked flask equipped with a stirrer and thermometer and heated under nitrogen to 100° C. for 13 hours. The reaction product is then heated to 140°–150° C. and degassified in vacuum to strip off excess o-allylphenol. The yield of o-allylphenol-4,4'-bisglycidylbisphenol-A adduct is 1207.3 grammes. The adduct shows a viscosity of 1200±400 mPa.s at 70° C.

EXAMPLE 2

Synthesis of eugenol/4,4'-bisglycidylbisphenol-A adduct

Eugenol (133 g), 4,4'-bisglycidylbisphenol A-epoxy resin (140 g) (Rutapox 0164) and triphenylethylphosphonium iodide (1.84 g) are placed into a 3 necked flask equipped with a stirrer and thermometer and heated under nitrogen to 100° C. for 13 hours. The reaction product is then heated to 140°–150° C. and degassified in vacuum to strip off excess eugenol. The yield of eugenol-4,4'-bisglycidylbisphenol-A adduct is 245 grammes. The adduct shows a viscosity of 3600 mPa.s at 70° C.

EXAMPLE 3

Synthesis of a o-allylphenyl/eugenol-4,4'-bisglycidylbisphenol A adduct

In a similar manner to that described in Example 1, o-allylphenol (64 g), eugenol (78.4 g), 4,4'-bisglycidylbisphenol-A (182.1 g) and triphenylethylphosphonium iodide (0.97 g) are reacted to give an adduct (yield 302 g) which shows a viscocity of 2500 mPa.s at 70° C.

EXAMPLE 4

Synthesis of o-allylphenol/1,3-bisglycidylresorcinol adduct

In a similar manner to that described in Example 1, o-allylphenol (134 g), 1,3-bisglycidylresorcinol (115.1 g), triphenylethylphosphonium iodide (0.75 g) and methylglycolate (145 g) were reacted at 100° C. for 13 hours. The solvent and excess o-allylphenol were removed by heating at 140° C. finally in vacuo. The yield of adduct was 227.9 g and it showed a viscocity of 280 mPa.s at 70° C.

EXAMPLE 5

Synthesis of 4,4'-bis[o-(1-propenyl)phenoxy]diphenylsulphone o-Allylphenol (67 g), 4,4'-dichlorodiphenylsulphone (71.75 g), potassium carbonate (36.25 g), dry N-methylpyrrolidone (150 ml) and toluene (70 ml) are placed in a 3-necked 1500 ml flask fitted with a stirrer, reflex condensor and thermometer and the mixture is heated under nitrogen to a temperature between 170°–185° C. and stirred for 3 hours. Water and toluene are separated via a Dean Stark trap and finally after 3.5 hours the reaction mixture reaches a temperature of 185° C. The mixture is cooled to 100° C. and a 1:1 mixture of toluene/water (600 ml) is added while stirring. After phase separation the organic layer is washed twice with toluene (150 ml) and the combined toluene layers are washed 3 times with water (300 ml). The toluene phase is dried over sodium sulphate and toluene distilled off by use of a rotary evaporator finally in vacuum leaving 4,4'-bis[o-(1-propenyl)phenoxy]diphenylsulphone as a light brown melt. The yield is 114 g.

EXAMPLE 6

Synthesis of 4,4'-bis-[o-methoxy-p-(1-propenyl)-phenoxy]-diphenylsulphone

In a similar manner to that described in Example 5 eugenol is employed for the synthesis of 4,4'-bis[o-methoxy-p-(1-propenyl)phenoxy]diphenylsulphone.

EXAMPLE 7

Synthesis of o-allylphenol/bisphenol A/4,4'-bisglycidylbisphenol A adduct 4,4'-bisglycidylbisphenol-A (152 g), bisphenol-A (45.6 g), o-allylphenol (53.6 g) and triphenylethylphosphoniumiodide (0.75 g) are reacted in a stirred 3-necked flask at a temperature of 115° C. for 11 hours. The adduct is finally degassified at 140° C. in vacuum. The yield of adduct is 203.7 g and it shows a viscosity which is greater than 20000 mPa.s at 70° C.

EXAMPLE 8

Synthesis of 4,4'-bis[o-(1-propenyl)phenoxy]benzophenone o-Allylphenol (245.6 g), 4,4'-difluorobenzophenone (200 g), potassium carbonate (187.4 g), dry N-methylpyrrolidone (700 ml) and toluene (250 ml) are placed in a 3-necked 2500 ml flask fitted with a stirrer, reflex condensor and thermometer and the mixture is heated under nitrogen to a temperature between 145°–155° C. and stirred for 3½ hours. Water and toluene are separated via a Dean Stark trap and finally after 3.5 hours the reaction mixture reaches a temperature of 155° C. The mixture is cooled to 100° C. and a 1:1 mixture of toluene/water (1100 ml) is added while stirring. After phase separation the aqueous layer is washed with toluene (300 ml) and the combined toluene layers are washed 4 times with water (400 ml). The toluene phase is dried over sodium sulphate and toluene distilled off by use of a rotary evaporator finally in vacuum leaving 4,4'-bis[o-(1-propenyl)-phenoxy]benzophenone as a light yellow melt. The yield is 363.3 g.

The product has a melt viscosity of 280 mPa.s at 80° C.

EXAMPLE 9

Synthesis of 4,4'-bis[o-methoxy-p-(1-propenyl)-phenoxy]benzophenone

In a similar manner to that described in Example 8 eugenol is employed for the synthesis of 4,4'-bis[o-methoxy-p-(1-propenyl)phenoxy]benzophenone.

EXAMPLE 10

Synthesis of 2,4'-bis[o-(1-propenyl)phenoxy]benzophenone o-Allylphenol (245.6 g), 2,4'-difluorobenzophenone (200 g), potassium carbonate (187.4 g), dry N-methylpyrrolidone (700 ml) and toluene (250 ml) are placed in a 3-necked 2500 ml flask fitted with a stirrer, reflex condensor and thermometer and the mixture is heated under nitrogen to a temperature of 160° C. and stirred for 8 hours. Water and toluene are separated via a Dean Stark trap and finally after 8 hours the reaction mixture reaches a temperature of 160° C. The mixture is cooled to 100° C. and a 1:1 mixture of toluene/water (1100 ml) is added while stirring. After phase separation the aqueous layer is washed with toluene (200 ml) and the combined toluene layers are washed 4 times with water (400 ml). The toluene phase is dried over sodium sulphate and toluene distilled off by use of a rotary evaporator finally in vacuum leaving 2,4'-bis[o-(1-propenyl)-phenoxy]benzophenone as a light yellow melt. The yield is 396 g.

The product has a melt viscosity of 350 mPa.s at 70° C.

EXAMPLE 11

Synthesis of 2,4'-bis[o-methoxy-p-(1-propenyl)-phenoxy]-benzophenone

In a similar manner to that described in Example 10 eugenol is employed for the synthesis of 2,4'-bis[o-methoxy-p-(1-propenyl)phenoxy]benzophenone.

EXAMPLE 12

Synthesis of 4-[o-(1-propenyl)phenoxy]benzophenone o-Allylphenol (33.5 g), 4-fluorobenzophenone (50.05 g), potassium carbonate (24.20 g), dry N-methylpyrrolidone (160 ml) and toluene (60 ml) are placed in a 3-necked 500 ml flask fitted with a stirrer, reflex condensor and thermometer and the mixture is heated under nitrogen to a temperature between 155°–160° C. and stirred for 3 hours. Water and toluene are separated via a Dean Stark trap and finally after 3 hours the reaction mixture reaches a temperature of 160° C. The mixture is cooled to 100° C. and a 1:1 mixture of toluene/water (400 ml) is added while stirring. After phase separation the aqueous layer is washed with toluene (50 ml) and the combined toluene layers are washed 4 times with water (150 ml). The toluene phase is dried over sodium sulphate and toluene distilled off by use of a rotary evaporator finally in vacuum leaving 4-[o-(1-propenyl)-phenoxy]-benzophenone as a light yellow melt. The yield is 73 g.

EXAMPLE 13

Synthesis of a mixture of 4,4'-bis[o-(1-propenyl)-phenoxy]benzophenone and 4-[o-(1-propenyl)phenoxy]-benzophenone o-Allylphenol (52.2 g), 4,4'-difluorobenzophenone (35 g), 4-fluorobenzophenone (13.8 g), potassium carbonate (37.75 g), dry N-methylpyrrolidone (200 ml) and toluene (75 ml) are placed in a 3-necked 1500 ml flask fitted with a stirrer, reflex condensor and thermometer and the mixture is heated under nitrogen to a temperature between 155°–160° C. and stirred for 3 hours. Water and toluene are separated via a Dean Stark trap and finally after 3 hours the reaction mixture reaches a temperature of 160° C. The mixture is cooled to 100° C. and a 1:1 mixture of toluene/water (400 ml) is added while stirring. After phase separation the aqueous layer is washed with toluene (100 ml) and the combined toluene layers are washed 4 times with water (150 ml). The toluene phase is dried over sodium sulphate and toluene distilled off by use of a rotary evaporator finally in vacuum leaving a 4,4'-bis-[o-(1-propenyl)phenoxy]benzophenone/4-[o-(1-propenyl)-phenoxy]benzophenone mixture as a light yellow melt. The yield is 89 g.

EXAMPLE 14

80 grammes of a bismaleimide resin mixture containing 56 parts of 4,4'-bismaleimidodiphenylmethane, 24 parts of 2,4-bismaleimidotoluene and 20 parts of 1,6-bismaleimido(2,2,4-trimethyl)hexane are melt blended with 25 g of the product of Example 1 at a temperature of 120° C. The homogeneous clear resin melt is degassed in vacuum and cast into a parallel epipedic steel mould and cured under pressure (5 bars) for 1 hour at 190° C., plus 3 hours at 200° C. After demoulding the resin casting was post-cured for 5 hours at 210° C. plus 5 hours at 250° C.

Properties:

| | |
|---|---|
| Density | 1.27 g/cm$^3$ |
| Flexural strength at 25° C. | 131 N/mm$^2$ |
| Flexural strength at 250° C. | 55 N/mm$^2$ |
| Flexural modulus at 25° C. | 3957 N/mm$^2$ |
| Flexural modulus at 250° C. | 1564 N/mm$^2$ |
| Fracture toughness at 25° C. | 400 J/m$^2$ |

EXAMPLE 15

80 grammes of a bismaleimide resin mixture containing 56 parts of 4,4'-bismaleimidodiphenylmethane, 24 parts of 2,4-bismaleimidotoluene and 20 parts of 1,6-bismaleimido(2,2,4-trimethyl)hexane are melt blended with 25 g of the product of Example 2 at a temperature of 120° C. The homogeneous clear resin melt is degassed in vacuum and cast into a parallel epipedic steel mould and cured under pressure (5 bars) for 1 hour at 190° C., plus 2 hours at 200° C. After demoulding the resin casting was post-cured for 5 hours at 210° C. plus 5 hours at 250° C.

Properties:

| | |
|---|---|
| Density | 1.29 g/cm$^3$ |
| Flexural strength at 25° C. | 127 N/mm$^2$ |
| Flexural strength at 250° C. | 66 N/mm$^2$ |
| Flexural modulus at 25° C. | 3673 N/mm$^2$ |
| Flexural modulus at 250° C. | 2290 N/mm$^2$ |
| Fracture toughness at 25° C. | 306 J/m$^2$ |

EXAMPLE 16

65 grammes of 4,4'-bismaleimidodiphenylmethane and 35 grammes of the o-allylphenol/1,3-bisglycidyl-resorcinol adduct prepared as described in Example 4 and 0.017% of imidazole catalyst were melt blended at 160° C. The homogenous clear resin melt is cast into a parallel epipedic steel mould and cured under pressure (5 bars) for 1.5 hours at 180° C. plus 3 hours at 200° C.

Properties:

| | |
|---|---|
| Density | 1.28 g/cm$^3$ |
| Flexural strength at 25° C. | 145 N/mm$^2$ |
| Flexural strength at 250° C. | 65 N/mm$^2$ |
| Flexural modulus at 25° C. | 3556 N/mm$^2$ |
| Flexural modulus at 250° C. | 1842 N/mm$^2$ |
| Fracture toughness at 25° C. | 335 J/m$^2$ |

EXAMPLE 17

80 grammes of a bismaleimide resin mixture containing 56 parts of 4,4'-bismaleimidodiphenylmethane, 24 parts of 2,4-bismaleimidotoluene and 20 parts of 1,6-bismaleimido(2,2,4-trimethyl)hexane are melt blended with 25 g of the product of Example 5 at a temperature of 120° C. The homogeneous clear resin melt is degassed in vacuum and cast into a parallel epipedic steel mould and cured under pressure (5 bars) for 1 hour at 190° C., plus 3 hours at 200° C. After demoulding the resin casting was post-cured for 5 hours at 210° C. plus 5 hours at 250° C.

Properties:

| | |
|---|---|
| Density | 1.30 g/cm$^3$ |
| Flexural strength at 25° C. | 110 N/mm$^2$ |
| Flexural strength at 250° C. | 64 N/mm$^2$ |
| Flexural modulus at 25° C. | 3662 N/mm$^2$ |
| Flexural modulus at 250° C. | 2515 N/mm$^2$ |
| Fracture toughness at 25° C. | 389 J/m$^2$ |

EXAMPLE 18

80 grammes of a bismaleimide resin mixture containing 56 parts of 4,4'-bismaleimidodiphenylmethane, 24 parts of 2,4-bismaleimidotoluene and 20 parts of 1,6-bismaleimido(2,2,4-trimethyl)hexane are melt blended with 25 g of the product of Example 6 at a temperature of 120° C. The homogeneous clear resin melt is degassed in vacuum and cast into a parallel epipedic steel mould and cured under pressure (5 bars) for 1 hour at 190° C., plus 3 hours at 200° C. After demoulding the resin casting was post-cured for 5 hours at 210° C. plus 5 hours at 250° C.

Properties:

| | |
|---|---|
| Density | 1.28 g/cm$^3$ |
| Flexural strength at 25° C. | 112 N/mm$^2$ |
| Flexural strength at 250° C. | 78.5 N/mm$^2$ |
| Flexural modulus at 25° C. | 3684 N/mm$^2$ |
| Flexural modulus at 250° C. | 2659 N/mm$^2$ |
| Fracture toughness at 25° C. | 231 J/m$^2$ |

EXAMPLES 19 to 22

(a) Manufacture of Products

The procedure to blend and cure mixtures comprising bismaleimides and o-allylphenol-4,4'-diglycidylbisphenol-A adducts (prepared as described in Example 1) is as follows:

A mixture of bismaleimides (150–250 g) as set out in Table 1 is blended with methylglycolacetate (200 g), followed by heating the mixture to temperatures of 120°–150° C. During heating the solvent is stripped off and to the melt is added the o-allylphenol-4,4'-diglycidylbisphenol-A adduct, prepared as described in Example 1. The resulting mixture is melt blended at 120°–130° C. and finally degassed in vacuum. Then the melt is cast into a parallel epipedic mould and cured for 1 hour at 180°–190° C., plus 3 hours at 200°–210° C. under pressure of 4 bars. After demoulding, the resin casting is postcured for 2 hours at 210° C., plus 5 hours at 250° C.

(b) Mechanical Properties of Polymers

Flexural properties are determined according to DIN 53423 at 23°, 177° and 250° C. Fracture toughness is measured by the modified ASTM method described hereinbefore for products prepared according to the manufacturing procedure set out above and the results are given in Table 1.

TABLE 1

| Example | BMI 1 (g) | BMI 2 (g) | Product of Example 1 (g) | Test Temperature (°C.) | FS (N/mm$^2$) | FM (N/mm$^2$) | $G_{IC}$ J/m$^2$ |
|---|---|---|---|---|---|---|---|
| 19 | 168 | 72 | 60 | 23 | 134.4 | 4230 | 151 |
| | | | | 177 | 79 | 2895 | — |
| | | | | 250 | 75 | 2259 | — |
| 20 | 147 | 63 | 90 | 23 | 152 | 3907 | 272 |
| | | | | 177 | 98 | 2878 | — |
| | | | | 250 | 80 | 2367 | — |
| 21 | 126 | 54 | 120 | 23 | 123 | 3870 | 446 |
| | | | | 177 | 98 | 2328 | — |
| | | | | 250 | 50 | 1239 | — |
| 22 | 105 | 45 | 150 | 23 | 132 | 4184 | 209 |
| | | | | 177 | 17 | 380 | — |
| | | | | 250 | — | — | — |

BMI 1 = 4,4'-bismaleimidodiphenylmethane
BMI 2 = 2,4-bismaleimidotoluene
FS = flexural strength
FM = flexural modulus
$G_{IC}$ = fracture toughness

EXAMPLES 23 to 27

(a) Manufacture of Products

The procedure to blend and cure mixtures comprising bismaleimides, aminobenzoic acid hydrazide and the o-allylphenol-4,4'-diglycidylbisphenol-A adduct prepared as described in Example 1 is as follows: m-Aminobenzoic acid hydrazide is blended with methylglycolacetate (100 g) and heated to 60° C. to obtain a solution. A mixture of bismaleimides as set out in Table 2 is added to the solution together with additional methylglycolacetate (100 g) and the mixture is heated to 120° C. until a homogeneous solution is obtained. Solvent is stripped off and to the remaining melt is added the o-allylphenol-4,4-diglycidylbisphenol-A adduct of Example 1 and the resulting homogeneous melt is degassed in vacuum. Then the melt is cast into a parallel epipedic mould and cured for 1 hour at 180°–190° C., plus 3 hours at 200°–210° C., under pressure of 4 bars. After demoulding, the resin casting is post-cured for 2 hours at 210° C., plus 5 hours at 250° C.

TABLE 2

| Example | BMI 1 (g) | BMI 2 (g) | m-ABH (g) | Product of Example 1 (g) | Test Temperature (°C.) | FS (N/mm²) | FM (N/mm²) | $G_{IC}$ J/m² |
|---|---|---|---|---|---|---|---|---|
| 23 | 182.7 | 78.3 | 9 | 30 | 23 | 90 | 4227 | 145 |
|   |       |      |   |    | 177 | 56 | 3174 | — |
|   |       |      |   |    | 250 | 47 | 2487 | — |
| 24 | 172.2 | 73.8 | 9 | 45 | 23 | 114 | 4031 | 168 |
|   |       |      |   |    | 177 | 67 | 3093 | — |
|   |       |      |   |    | 250 | 60 | 2620 | — |
| 25 | 161.7 | 69.3 | 9 | 60 | 23 | 132 | 4086 | 178 |
|   |       |      |   |    | 177 | 99 | 3124 | — |
|   |       |      |   |    | 250 | 87 | 2715 | — |
| 26 | 149.1 | 63.9 | 9 | 78 | 23 | 127 | 3956 | 228 |
|   |       |      |   |    | 177 | 81 | 2885 | — |
|   |       |      |   |    | 250 | 74 | 2450 | — |
| 27 | 136.5 | 58.5 | 9 | 105 | 23 | 142 | 3736 | 344 |
|   |       |      |   |    | 177 | 65 | 2127 | — |
|   |       |      |   |    | 250 | 47 | 1428 | — |

BMI 1 = 4,4'-bismaleimidodiphenylmethane
BMI 2 = 2,4-bismaleimidotoluene
m-ABH = m-Aminobenzoic acid hydrazide
FS = flexural strength
FM = flexural modulus
$G_{IC}$ = fracture toughness

EXAMPLES 28-43

(a) Manufacture of Products m-Aminobenzoic acid hydrazide (4 parts) is blended with methylglycolate and heated to 60° C. to obtain a solution. A mixture of 4,4'-bismaleimidodiphenylmethane (70 parts), 2,4-bismaleimidotoluene (30 parts) and 1,6-bismaleimido(2,2,4-trimethyl)hexane (2 parts) and methylglycolate was added and the mixture heated to 120° C. to give a homogeneous solution. The solvent was stripped off to give a molten BMI blend. The weight of this blend given in Table 3 was taken and the weight of the product of Examples 5, 6, 8, 9, 10 or 11 was added to give a homogenous melt which was degassed in vacuum, cast into a parallel epipedic mould and cured for 4 hours at 140° C. and then for 12 hours at 200°-210° C. under a pressure of 4 bars. After demoulding the casting is post-cured for 5 hours at 250° C.

(b) Mechanical properties of cured polymers

Flexural properties are determined according to DIN 53423 at 25°, 177° and 250° C. Fracture toughness is measured by the modified ASTM method described hereinbefore. The properties of the cured polymers prepared according to the manufacturing procedure set out above and the results are given in Table 3 in which FS, FM and $G_{IC}$ have the meaning given in Tables 1 and 2.

TABLE 3

| Example | BMI 1 (g) | Product of Ex. No. | Product of Ex. (g) | Test Temperature (°C.) | FS (N/mm²) | FM (N/mm²) | $G_{IC}$ J/m² |
|---|---|---|---|---|---|---|---|
| 28 | 80 | 5 | 20 | 23 | 113 | 3990 | 355 |
|    |    |   |    | 250 | 73 | 2820 | — |
| 29 | 70 | 5 | 30 | 23 | 114 | 3940 | 230 |
|    |    |   |    | 250 | 73 | 2620 | — |
| 30 | 60 | 5 | 40 | 23 | 114 | 3580 | 267 |
|    |    |   |    | 250 | 73 | 2150 | — |
| 31 | 55 | 5 | 45 | 23 | 112 | 3740 | 227 |
|    |    |   |    | 250 | 50 | 1670 | — |
| 32 | 50 | 5 | 50 | 23 | 112 | 3950 | 225 |
|    |    |   |    | 250 | 26 | 910 | — |
| 33 | 80 | 6 | 20 | 23 | 87 | 3850 | 234 |
|    |    |   |    | 177 | 62 | 3130 | — |
|    |    |   |    | 250 | 56 | 2820 | — |
| 34 | 60 | 6 | 40 | 23 | 128 | 3490 | 378 |
|    |    |   |    | 177 | 88 | 2690 | — |
|    |    |   |    | 250 | 83 | 2380 | — |
| 35 | 80 | 8 | 20 | 23 | 106 | 3961 | 191 |
|    |    |   |    | 177 | 75 | 3054 | — |
|    |    |   |    | 250 | 65 | 2662 | — |
| 36 | 70 | 8 | 30 | 23 | 132 | 3607 | 397 |
|    |    |   |    | 177 | 87 | 2744 | — |
|    |    |   |    | 250 | 90 | 2470 | — |
| 37 | 60 | 8 | 40 | 23 | 132 | 3702 | 439 |
|    |    |   |    | 177 | 84 | 2469 | — |
|    |    |   |    | 250 | 55 | 1710 | — |
| 38 | 80 | 9 | 20 | 23 | 114 | 4171 | 247 |
|    |    |   |    | 177 | 77 | 3132 | — |
|    |    |   |    | 250 | 77 | 2472 | — |
| 39 | 70 | 9 | 30 | 23 | 119 | 3790 | 545 |
|    |    |   |    | 177 | 86 | 3415 | — |
|    |    |   |    | 250 | 85 | 2545 | — |
| 40 | 60 | 9 | 40 | 23 | 122 | 3594 | 466 |
|    |    |   |    | 177 | 93 | 2790 | — |
|    |    |   |    | 250 | 81 | 2435 | — |
| 41 | 80 | 10 | 20 | 23 | 104 | 3987 | 293 |

TABLE 3-continued

| Example | BMI 1 (g) | Product of Ex. No. | (g) | Test Temperature (°C.) | FS (N/mm²) | FM (N/mm²) | $G_{IC}$ J/m² |
|---|---|---|---|---|---|---|---|
| | | | | 177 | 64 | 3156 | — |
| | | | | 250 | 66 | 2506 | — |
| 42 | 70 | 10 | 30 | 23 | 111 | 3871 | 323 |
| | | | | 177 | 72 | 2923 | — |
| | | | | 250 | 65 | 2501 | — |
| 43 | 60 | 10 | 40 | 23 | 82 | 3822 | 467 |
| | | | | 177 | 64 | 2465 | — |
| | | | | 250 | 50 | 1736 | — |

EXAMPLE 44

80 grammes of a bismaleimide resin mixture containing 56 parts of 4,4'-bismaleimidodiphenylmethane, 24 parts of 2,4-bismaleimidotoluene and 20 parts of 1,6-bismaleimido(2,2,4-trimethyl)hexane are melt blended with 50 g of the product of Example 7 at a temperature of 120° C. The homogeneous clear resin melt is degassed in vacuum and cast into a parallel epipedic steel mould and cured under pressure (5 bars) for 1 hour at 190° C., plus 3 hours at 210° C. After demoulding the resin casting was post-cured for 5 hours at 210° C. plus 5 hours at 250° C.

Properties:

| Density | 1.26 g/cm³ |
|---|---|
| Flexural strength at 25° C. | 99 N/mm² |
| Flexural strength at 250° C. | 42 N/mm² |
| Flexural modulus at 25° C. | 3427 N/mm² |
| Flexural modulus at 250° C. | 1181 N/mm² |
| Fracture toughness at 25° C. | 207 J/m² |

EXAMPLE 45 m-Aminobenzoic acid hydrazide (4 parts) is blended with methylglycolate and heated to 60° C. to obtain a solution. A mixture of 4,4'-bismaleimidodiphenylmethane (70 parts), 2,4-bismaleimidotoluene (30 parts) and 1,6-bismaleimido(2,2,4-trimethyl)hexane (2 parts) and methylglycolate was added and the mixture heated to 120° C. to give a homogeneous solution. The solvent was stripped off to give a molten BMI resin to which 66 parts of the product of Example 12 was added and melt blended. The homogeneous melt was degassed in vacuum, cast into a parallel epipedic mould and cured for 2 hours at 170° C., plus 4 hours at 210° C., at a pressure of 4 bars. After demoulding, the casting is post-cured for 5 hours at 240° C.

Properties:

| Density | 1.26 g/cm³ |
|---|---|
| Flexural strength at 25° C. | 116 N/mm² |
| Flexural strength at 177° C. | 60 N/mm² |
| Flexural modulus at 25° C. | 4013 N/mm² |
| Flexural modulus at 177° C. | 2080 N/mm² |
| Fracture toughness at 25° C. | 321 J/m² |

We claim:

1. A laminated article, formed by heating under pressure an alternating stack of cast film and layers of reinforcing material, said cast film having been cast from a solution of 25 to 65% by weight of a curable resin in an inert organic solvent selected from the group consisting of dimethylformamide, dimethylacetamide, N-methyl pyrrolidone, tetramethyl urea, acetone, methylethyl ketone, methylisobutyl ketone, cyclohexanone, methylene chloride, ethyl chloride, 1, 2-dichloroethane, dioxane, tetrahydrofuran, ethyl glycol, ethyl acetate, ethyl glycol acetate, methyl glycol acetate, diethyleneglycol diethyl ether, diethyleneglycol monoethyl either acetate and mixtures thereof; said curable resin comprising a mixture of:

(a) at least one bisimide of the general formula I

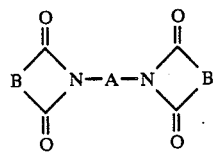

in which B represents a divalent radical containing a carbon-carbon double bond and A is a divalent radical containing at least two carbon atoms and (b) at least one alkenyl compounds of formula II $$D(G)_m \qquad II$$

or (v) a divalent group of formula IIe

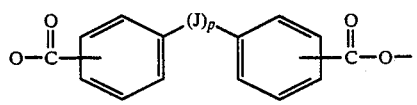

in which J is a divalent group chosen from —SO₂—, —SO—, —CMe₂—, —O—, —C(CF₃)₂—, —CH₂— or —CO— and p is 0 or 1.

2. The article according to claim 1, in which the bisimide of the general formula I is characterised in that A is a member selected from the groups consisting of
(a) an alkylene group with up to 12 carbon atoms,
(b) a cycloalkylene group with 5 to 6 carbon atoms,
(c) a heterocyclic group with 4 to 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formulae IIIa to IIIj

     IIIa

     IIIb

     IIIc

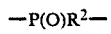     IIId

-continued

   IIIe

   IIIf

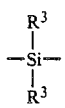   IIIg

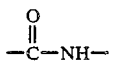   IIIh

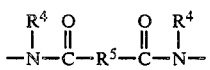   IIIi

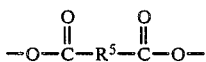   IIIj the radicals $R_1$, $R_2$, $R_3$, $R_4$, being alkyl groups with one to five carbon atoms, $R_5$ being an alkylene group or an arylene group and B is a group which is capable of addition polymerization selected from a group of formula IV, V, VI or VII

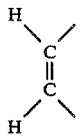   IV

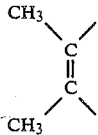   V

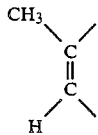   VI

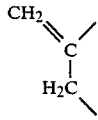   VII

3. The article as claimed in claim 2 in which the bisimide of formula I is selected from the group consisting of 1,2-bismaleimidodethane, 1,6-bismaleimidohexane, 1,12-bismaleimidododecane, 1,6-bismaleimido(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 3,3'-bismaleimidodiphenylsulphone, 4,4'-bismaleimidodiphenylsuphone, 4,4'-bismaleimidodicyclohexylmethane, 2,4-bismaleimidotoluene, 2,6-bismaleimidotoluene, 2,4-bismaleimidoanisole, N,N'-m-xylylenebismaleimide, N,N'-p-xylylenebismaleimide and mixtures thereof.

4. The article as claimed in claim 3 in which the bisimide of formula I comprises (i) eutectic mixtures containing 4,4'-bismaleimidodiphenylmethane and 2,4-bismaleimidotoluene, (ii) eutectic mixtures containing 4,4'-bismaleimidodiphenylmethane, 2,4-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

5. The article as claimed in claim 1, in which the bisimide of formula I is modified with amino acid hydrazides, polyamines, polyhydrazides, azomethines, polyisocyanates, carboxy-terminated or acrylic/vinyl-terminated polybutadiene/acrylonitrile elastomers, thermoplastic polymers or mixtures thereof.

6. The article as claimed in claim 1, wherein D represents a divalent group of formula IIb said alkenyl compound being prepared by the reaction of an alkenylphenol and a compound of formula VIII in which F is as defined in claim 1 and X represents halo.

7. The article as claimed in claim 6 in which the alkenylphenol is allylphenol, eugenol, or diallylbisphenol A.

8. The article as claimed in claim 1, in which the alkenyl compound is represented by formula IIp

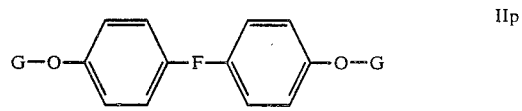   IIp in which F is —SO₂— or —CO— and G represents a group of formula IIk or IIn.

9. The article as claimed in claim 1, wherein D is a group of formula IIc in which F is —CO— and G is a group of formula IIk or IIn.

10. The article as claimed in claim 1, wherein the ratio of the number of moles of bisimide present to the number of moles of alkenyl compound present lies in the range 1:1 to 50:1.

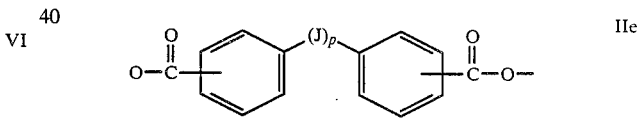   IIe

11. The article as claimed in claim 1, in which D represents a polyvalent group of formula IIa in which the group E is (i) an alkylene group, (ii) a cyclalkylene group containing 5 or 6 carbon atoms, (iii) phenylene, (iv) a heterocyclic group containing at least one nitrogen, oxygen or sulphur atom in the ring, (v) a mono or dicarbocyclic group, (vi) a group of formula IIf

   IIf in which K represents an optionally substituted mono or dicarbocyclic aromatic or cycloalkylene group, q is 0 or 1 and L is a divalent group selected from —SO₂—, —SO—, —CMe₂—, —O—, —C(CF₃)₂—, —CH₂— or —CO— or (viii) a high molecular weight epoxy compound.

12. The article as claimed in claim 11, in which the alkenyl compound is represented by formula IIg

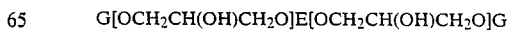

in which E is a m-phenylene group or a group of formula IIh

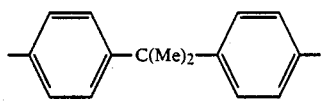

and G represents a group of formula IIj or IIk

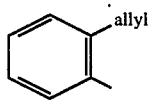   IIj

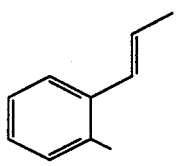   IIk or of formula IIm or IIn

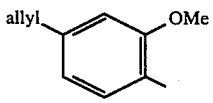   IIm

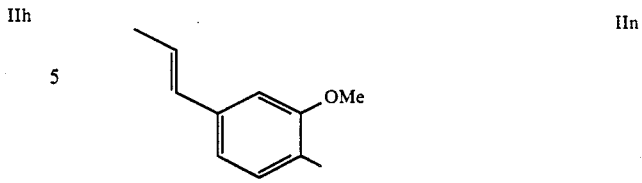   IIn

13. The article as claimed in claim 1, in which D represents a group of formula IId or IIe and G represents a group of formula IIj or IIm.

14. The article as claimed in claim 1, wherein said solution contains up to 80% of the total resin mixture by weight of a reactive diluent which carries at least one polymerizable double bond and is one of the following compounds: styrene, methylstyrene, vinyltoluene, divinylbenzene, 1-ethyl-4-vinylbenzene, vinylcyclohexane, divinylcyclohexane, vinylpyridine, vinylpyrrolidone, unsaturated polyesters or mixtures thereof.

15. The article as claimed in claim 14, wherein the reactive diluent is styrene or divinylbenzene, the reactive diluent being present in quantities up to 30% of the total final resin mixture by weight.

16. The article as claimed in claim 1, in which a catalyst is present in said solution in an amount of 0.01 to 10% by weight based on the total weight of the curable bisimide resins.

* * * * *